US010756977B2

(12) United States Patent
Branquinho Teresa Maria et al.

(10) Patent No.: US 10,756,977 B2
(45) Date of Patent: Aug. 25, 2020

(54) NODE RELEVANCE DETERMINATION IN AN EVOLVING NETWORK

(71) Applicant: International Business Machines Corporation, Armonk, NY (US)

(72) Inventors: Joana Sofia Branquinho Teresa Maria, New York, NY (US); Mary E. Helander, North White Plains, NY (US); Nizar Lethif, Kozhikode (IN); Emily A. Ray, Hastings on Hudson, NY (US); Kush R. Varshney, Ossining, NY (US); Hemank Lamba, Pittsburgh, PA (US)

(73) Assignee: International Business Machines Corporation, Armonk, NY (US)

( * ) Notice: Subject to any disclaimer, the term of this patent is extended or adjusted under 35 U.S.C. 154(b) by 163 days.

(21) Appl. No.: 15/987,048

(22) Filed: May 23, 2018

(65) Prior Publication Data

US 2019/0363937 A1 Nov. 28, 2019

(51) Int. Cl.
*G06F 15/177* (2006.01)
*H04L 12/24* (2006.01)

(52) U.S. Cl.
CPC ........ *H04L 41/0853* (2013.01); *H04L 41/046* (2013.01); *H04L 41/0816* (2013.01); *H04L 41/14* (2013.01)

(58) Field of Classification Search
CPC ............... H04L 41/0853; H04L 41/046; H04L 41/0816; H04L 41/41

(Continued)

(56) References Cited

U.S. PATENT DOCUMENTS 6,460,025 B1 10/2002 Fohn et al.
6,704,874 B1 * 3/2004 Porras ............... H04L 41/142
709/224

(Continued)

FOREIGN PATENT DOCUMENTS

WO WO2011020880 A1 2/2011

OTHER PUBLICATIONS

Bollobás, "A problem of the theory of communication networks", Theory of Graphs, Acta Mathemiae Academiae Scientiarum Hugaricae, Tomus 19 (1-2), (Mar. 1968), pp. 75-80.

(Continued)

*Primary Examiner* — Liang Che A Wang
(74) *Attorney, Agent, or Firm* — Scully, Scott, Murphy & Presser, P.C.; Daniel P. Morris, Esq.

(57) ABSTRACT

Methods and systems for determining a time dependent relevancy score of an agent node among an evolving heterogeneous network are described. A processor may expand the heterogeneous network by generating temporal heterogeneous networks representing states of the heterogeneous network at different times. The processor may extract a set of agent nodes from each temporal heterogeneous network and may generate a relationship network based on the extracted agent nodes for each temporal heterogeneous network. The processor may remove the agent node from the temporal heterogeneous network to generate a conditional relationship network excluding the removed agent node. The processor may determine a relevancy score for the agent node based on the corresponding relationship network and the conditional relationship network. Each relevancy score for the agent node may correspond to a temporal heterogeneous network and may indicate an impact of removing the agent node from the corresponding temporal heterogeneous network.

20 Claims, 8 Drawing Sheets

(58) Field of Classification Search
USPC .................................. 709/221, 223, 224
See application file for complete search history.

(56) References Cited

U.S. PATENT DOCUMENTS

| | | | |
|---|---|---|---|
| 6,845,372 B2* | 1/2005 | Bates ................. | G06F 16/9535 |
| 7,480,645 B2* | 1/2009 | Allys .................... | G06F 16/353 |
| 7,546,287 B2* | 6/2009 | Subramaniam ........ | G06Q 10/06 |
| 7,565,367 B2* | 7/2009 | Barrett ................ | G06F 16/9535 |
| 7,599,911 B2* | 10/2009 | Manber ................. | G06F 16/951 |
| 7,664,734 B2* | 2/2010 | Lawrence ........... | G06F 17/2229 |
| | | | 707/767 |
| 8,326,885 B2 | 12/2012 | Inokuchi et al. | |
| 8,359,276 B2 | 1/2013 | Zhuang et al. | |
| 9,002,658 B2 | 4/2015 | Young et al. | |
| 9,075,734 B2 | 7/2015 | Lee et al. | |
| 9,218,630 B2 | 12/2015 | Yang et al. | |
| 9,229,988 B2 | 1/2016 | Vadrevu et al. | |
| 9,727,842 B2* | 8/2017 | Caceres ................. | G06Q 10/10 |
| 2009/0083262 A1* | 3/2009 | Chang ................. | G06F 16/9535 |
| 2009/0271394 A1* | 10/2009 | Allen ..................... | G06Q 30/02 |
| 2013/0132138 A1 | 5/2013 | Doganata et al. | |
| 2013/0268458 A1 | 10/2013 | Ilardi et al. | |
| 2014/0310058 A1 | 10/2014 | Aral et al. | |
| 2014/0365454 A1 | 12/2014 | Simon et al. | |
| 2015/0006241 A1 | 1/2015 | Jamal et al. | |
| 2015/0332158 A1 | 11/2015 | He et al. | |
| 2016/0292233 A1 | 10/2016 | Wilkinson et al. | |
| 2017/0076216 A1 | 3/2017 | Akrotirianakis et al. | |
| 2017/0228277 A1 | 8/2017 | Cheng et al. | |

OTHER PUBLICATIONS

Gusfield, "Connectivity and edge-disjoint spanning trees", Information Processing Letters, 16 (1983) pp. 87-89, North-Holland Publishing Company, Feb. 26, 1983.

Tutte, "On the problem of decomposing a graph into n connected factors", J. London Math. Soc., 36 (1961), pp. 221-230, received Apr. 29, 1960.

Borgatti, S.P., "The Key Player Problem," Sep. 21, 2002, Retrieved from Internet using: https://www.google.com/url?sa=t&rct=j&q=&esrc=s&source=web&cd=3&ved=0ahUKEwjLluvKz6jYAhVlcd8KHbreCMgQFgg3MAI&url=http%3A%2F%2Fwww.casos.cs.cmu.edu%2Fevents%2Fsummer_institute%2F2006%2Freading_list%2Fborgatti%2FBorgatti_Key_Player.pdf&usg=AOvVaw1D3ASQI_ClwniaHi038Q9G,12 pages, Accessed on May 15, 2018.

Borgatti, S.P., "Identifying sets of key players in a social network," Computational & Mathematical Organization Theory (2006),12, pp. 21-34, Retrieved from Internet using: https://www.bebr.ufl.edu/sites/default/files/Borgatti%20-%202006%20-%20Identifying%20sets%20of%20key%20players%20in%20a%20social%20networ.pdf, Accessed on May 15, 2018.

Borgatti, S.P., "Centrality and network flow", Department of Organization Studies, Boston College, Carroll School of Management, Chestnut Hill, MA 02467, USA, Social Networks, Jan. 2005, pp. 55-71, vol. 27, Issue 1.

Karthika, S., et al., "Identifying Key Players in a Covert Network using Behavioral Profile," 2012 International Conference on Recent Trends in Information Technology, Apr. 19-21, 2012, pp. 22-27.

Karthika, S., et al., "Whom to remove? Breaking the covert network," 2013 Fifth International Conference on Advanced Computing (ICoAC), Dec. 18-20, 2013, pp. 348-354.

Shi, X., et al., "Satellite telemetry time series clustering with improved key points series segmentation," 2017 Prognostics and System Health Management Conference (PHM-Harbin), Jul. 9-12, 2017, pp. 1-7.

Chen, Y., et al., "A Note on "Reliability Polynomials and Link Importance in Networks"", IEEE Int. Conf. Neural Networks & Signal Processing, Dec. 14-17, 2003, pp. 1674-1676.

Shah, D., et al., "Rumor Centrality: A Universal Source Detector", SIGMETRICS '12, Jun. 11-15, 2012, pp. 199-210.

Freeman, L.C., "A Set of Measure of Centrality Based on Betweenness", Sociometry, Mar. 1977, pp. 35-41, vol. 40, No. 1.

Freeman, L.C., "Centrality in Social Networks Conceptual Clarification", Social Networks, 1978-1979, pp. 215-239, vol. 1, Issue 3.

Freeman, L.C., "Centrality in valued graphs: A measure of betweenness based on network flow", Social Networks, Jun. 1991, pp. 141-154, vol. 13, Issue 2.

Granovetter, M.S., "The Strength of Weak Ties", American Journal of Sociology, May 1973, pp. 1360-1380, vol. 78, Issue 6.

Page, L.B., "Reliability Polynomials and Link Importance in Networks", IEEE Transactions on Reliability, Mar. 1994, pp. 51-58, vol. 43, No. 1.

* cited by examiner

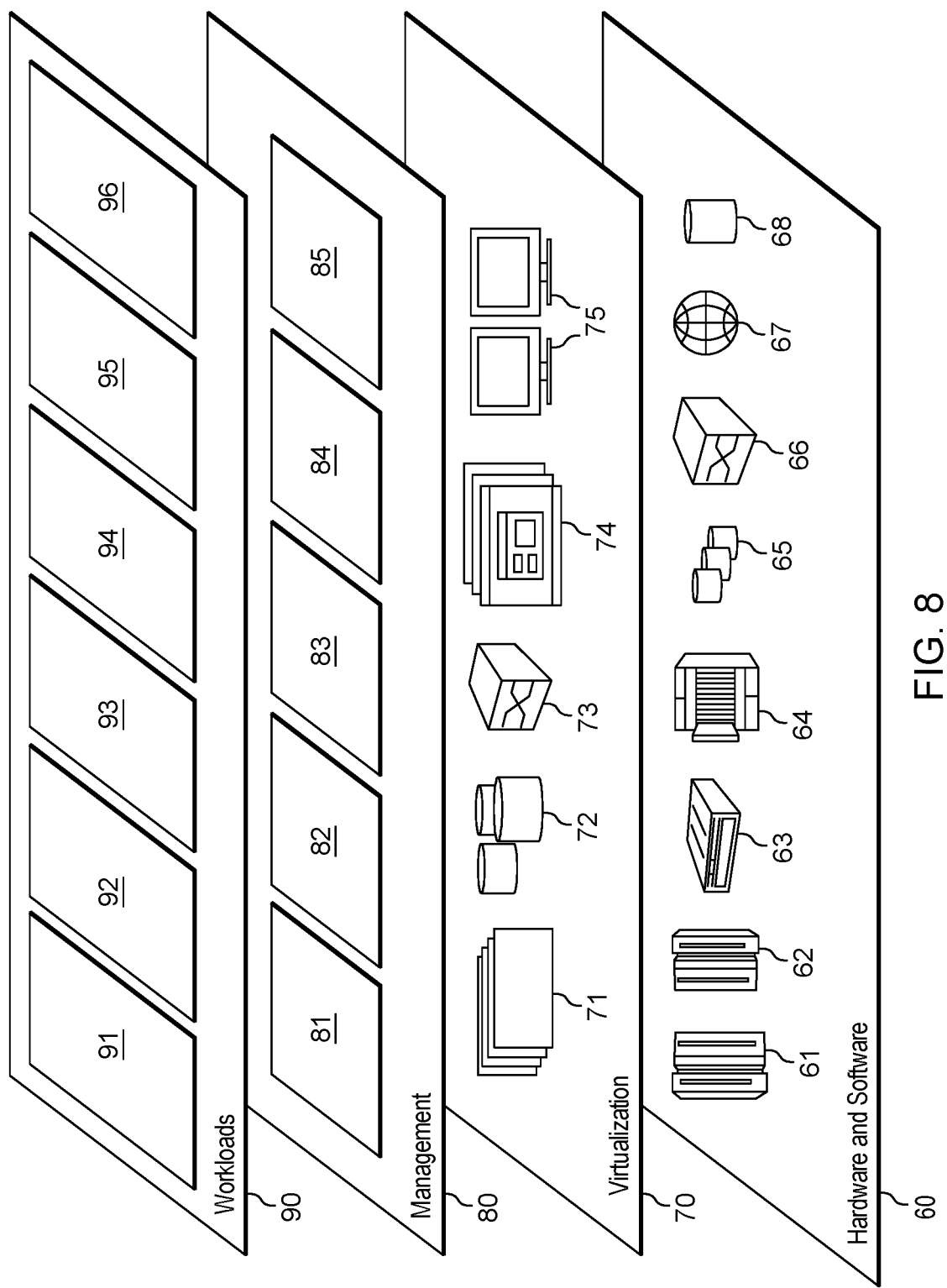

NODE RELEVANCE DETERMINATION IN AN EVOLVING NETWORK

FIELD

The present application relates generally to computers, and computer applications, and more particularly to computer-implemented methods and systems relating to network analysis.

BACKGROUND

Network analysis systems may be implemented to determine scores of nodes within a network, where the determined scores may indicate an importance of each node with respect to the network. Determination of the scores of the nodes in the network, when the network is static, may provide information on an importance of each node at a particular state of the network at a particular time. However, the network may experience changes, such as additions and removal of nodes and edges, over time. When the changes to the network are neglected, the importance indicated by the determined scores of each node may be inaccurate.

SUMMARY

In some examples, a method for generating relevancy data of at least one node in a heterogeneous network that changes with time is generally described. The method may include generating, by a processor, a series of temporal heterogeneous networks. Each temporal heterogeneous network may be a state of the heterogeneous network at a time window, and each temporal heterogeneous network may include a respective set of agent nodes and a respective set of non-agent nodes. The method may further include, for each temporal heterogeneous network, extracting, by the processor, a set of agent nodes. The method may further include, for each temporal heterogeneous network, generating, by the processor, a relationship network based on the extracted agent nodes. The relationship network may include the extracted agent nodes, and the relationship network corresponds to the temporal heterogeneous network. The method may include, for each agent node among each pair of temporal heterogeneous network and relationship network, removing, by the processor, the agent node from the temporal heterogeneous network. The method may include, for each agent node among each pair of temporal heterogeneous network and relationship network, generating, by the processor, a conditional relationship network based on the remaining agent nodes among the temporal heterogeneous network after the removal of the agent node. The method may include, for each agent node among each pair of temporal heterogeneous network and relationship network, determining, by the processor, a relevancy score for the removed agent node based on the relationship network and based on the conditional relationship network. The relevancy score may correspond to the time window. The method may include generating, by the processor, the relevancy data based on the relevancy scores for each agent node among each temporal heterogeneous network. The relevancy data may indicate changes of the relevancy scores of each agent node with respect to time.

In some examples, a system effective to generate relevancy data for at least one node among a heterogeneous network that changes with time is generally described. The system may include a memory configured to store a database including records related to at least one entity. The system may further include a processor configured to be in communication with the memory. The processor may be configured to generate a series of temporal heterogeneous networks based on the database stored in the memory. Each temporal heterogeneous network may be a state of the heterogeneous network at a time window, and each temporal heterogeneous network includes a respective set of agent nodes and a respective set of non-agent nodes. The processor may be further configured to, for each temporal heterogeneous network, extract a set of agent nodes. The processor may be further configured to, for each temporal heterogeneous network, generate a relationship network based on the extracted agent nodes. The relationship network may include the extracted agent nodes, and the relationship network may correspond to the temporal heterogeneous network. The processor may be further configured to, for each agent node among each pair of temporal heterogeneous network and relationship network, remove the agent node from the temporal heterogeneous network. The processor may be further configured to, for each agent node among each pair of temporal heterogeneous network and relationship network, generate a conditional relationship network based on the remaining agent nodes among the temporal heterogeneous network after the removal of the agent node. The processor may be further configured to, for each agent node among each pair of temporal heterogeneous network and relationship network, determine a relevancy score for the removed agent node based on the relationship network and based on the conditional relationship network. The relevancy score may correspond to the time window. The processor may be further configured to generate the relevancy data based on the relevancy scores for each agent node among each temporal heterogeneous network. The relevancy data may indicate changes of the relevancy scores of each agent node with respect to time.

In some examples, a computer program product for generating relevancy data that represents an importance of a node among a heterogeneous network that changes with time is generally described. The computer program product may include a computer readable storage medium having program instructions embodied therewith. The program instructions may be executable by a processing element of a device to cause the device to perform one or more methods described herein.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 8 depicts abstraction model layers according to an embodiment of the present invention.

DETAILED DESCRIPTION

Figure 1:
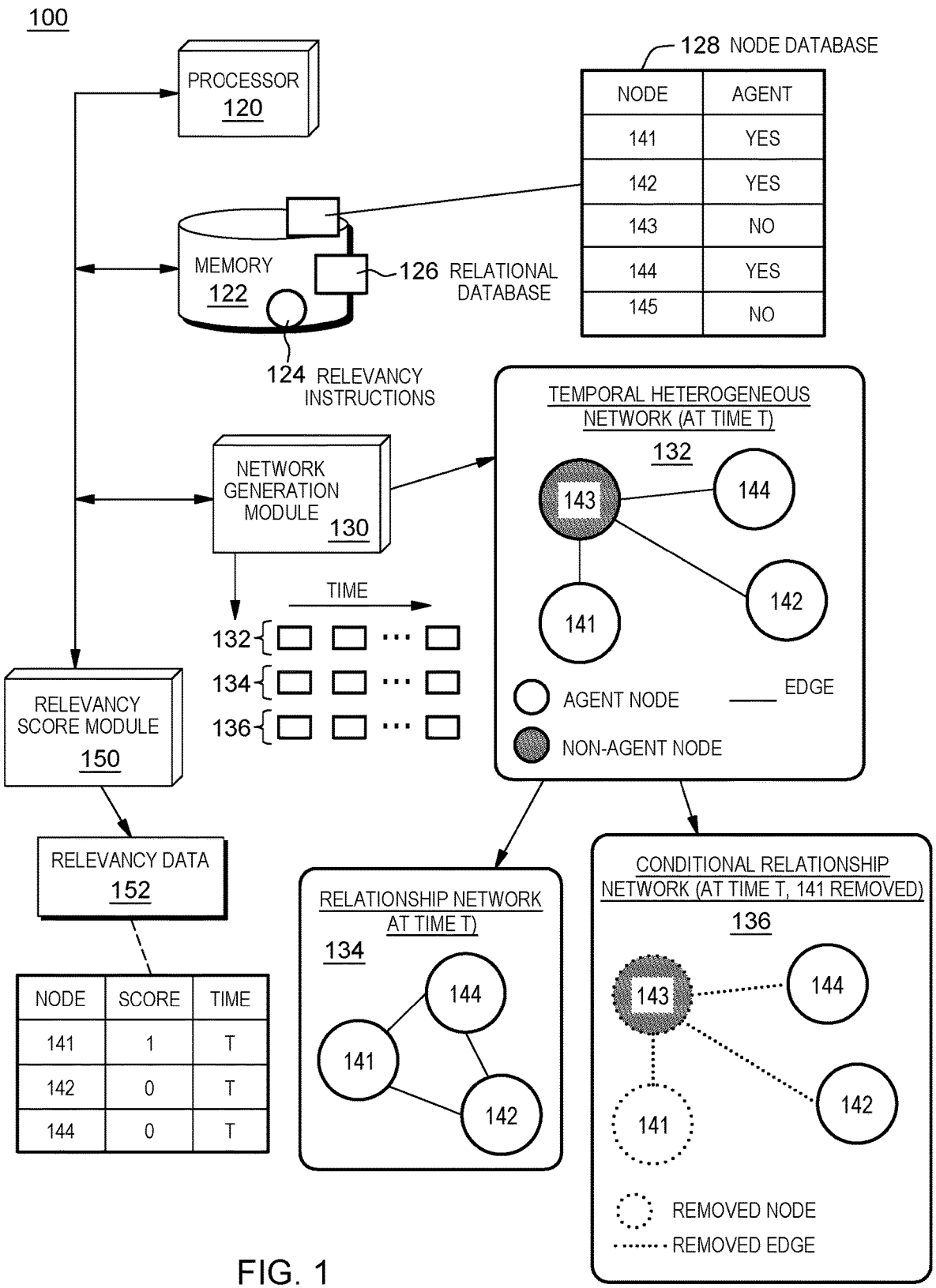
FIG. 1 illustrates an example computer system in one embodiment that can be utilized to implement node relevance determination in an evolving network in one embodiment of the present disclosure.
Figure 2A:
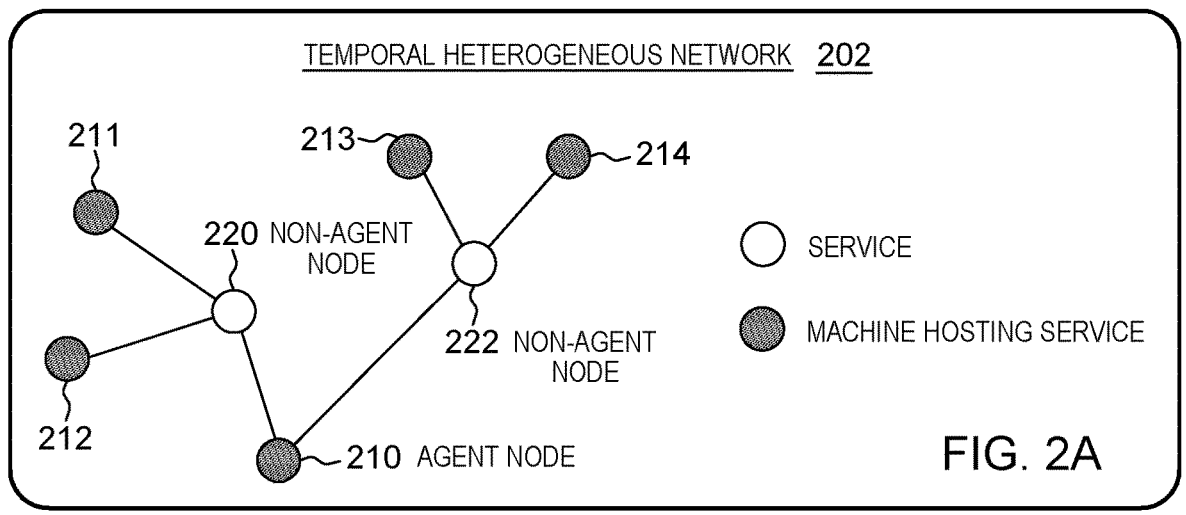
FIG. 2A illustrates the example system of FIG. 1 with additional details relating to a temporal heterogeneous network in one embodiment of the present disclosure.
Figure 2B:
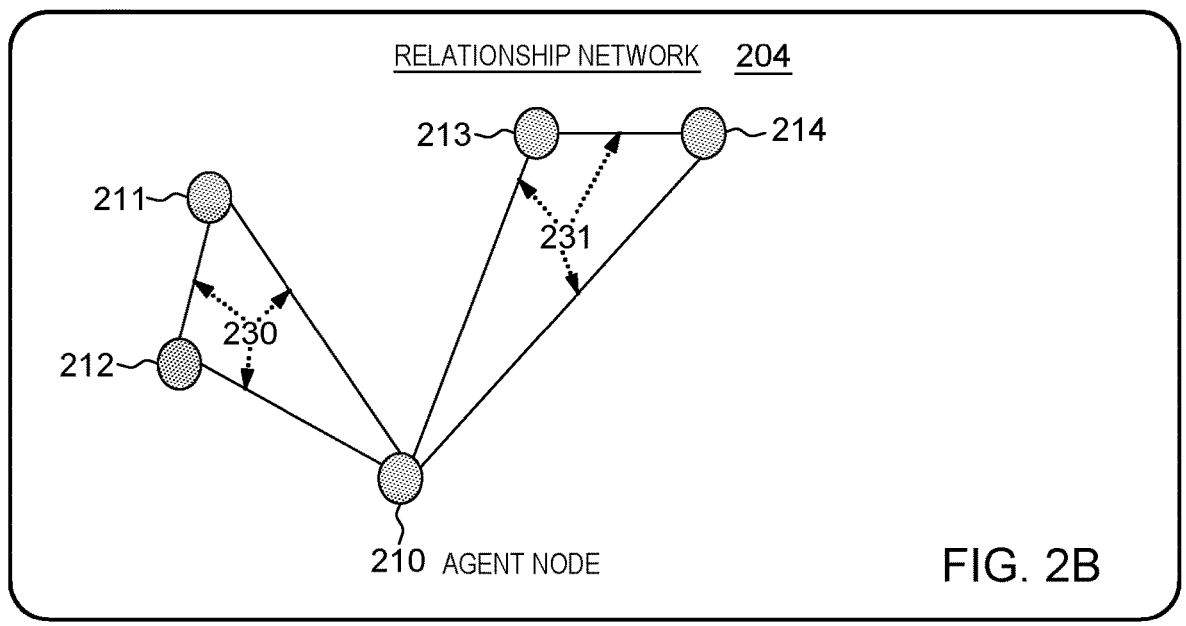
FIG. 2B illustrates the example system of FIG. 1 with additional details relating to a relationship network in one embodiment of the present disclosure.
Figure 2C:
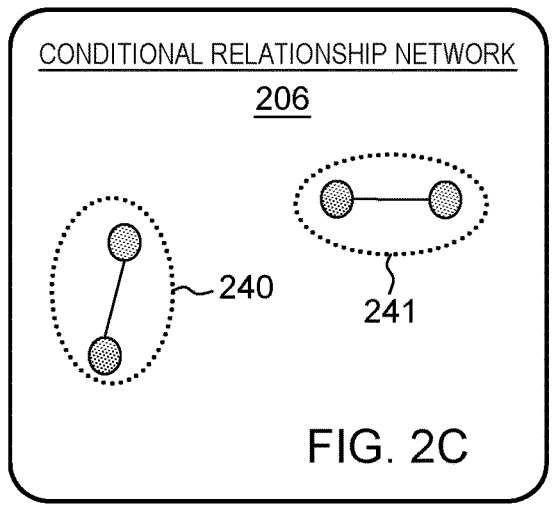
FIG. 2C illustrates the example system of FIG. 1 with additional details relating to a conditional relationship network in one embodiment of the present disclosure.
Figure 2D:
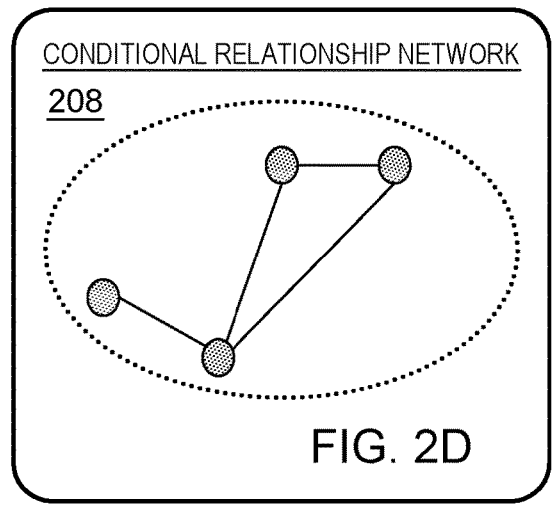
FIG. 2D illustrates the example system of FIG. 1 with additional details relating to a conditional relationship network in one embodiment of the present disclosure.

A system in accordance with the present disclosure (e.g., system 100 shown in FIG. 1) may determine the importance of one or more nodes with respect to a heterogeneous network that evolves with time. A heterogeneous network may be a network that includes a set of agent nodes and a set of non-agent nodes, and may also include edges representing relationship among the agent nodes and the non-agent nodes. In some examples, a network may be deemed as a heterogeneous network because the agent nodes have possible relationships to one or more specific types of non-agent nodes. An agent node may be a node that creates new components (nodes or edges) in the heterogeneous network. A non-agent node may be a node that does not create new components in the heterogeneous network. An agent node may act as nucleators of network growth and connectivity of the heterogeneous network because of the capability to create new components. Therefore, a determination of a relevancy score for the agent nodes may facilitate identification of the most important nodes among the heterogeneous network. Further, determination of a time dependent relevancy score of an agent node may facilitate a determination of changes to the importance of the agent node, which may further indicate an impact of the agent node may have on the heterogeneous network.

The system 100 may be implemented to determine time dependent relevancy scores of agent nodes of a heterogeneous network that changes with time. The system 100 may provide a practical application that improves a network analysis system by addressing challenges of identifying important nodes among a dynamically evolving heterogeneous network. The system 100 may consider the effects of changes in the heterogeneous network (e.g., addition and removal of nodes and relationships at different times) in the determination of the time dependent relevancy scores of the agent nodes. The system 100 may provide a structure to consider the impact of nodes in the growth and connectivity of a network and network dynamics.

In an example, a heterogeneous network may include at least one agent, where each agent may be a node representative of an entity such as a person, an organization, and/or another type of entity. Each agent node among the heterogeneous network may have relationships to other agent nodes and non-agent nodes, where the relationships may be represented as an edge, and each edge may connect two nodes. A non-agent node may be a node representative of non-entities, such as a project, a location, a hobby, etc. For each time instance, the system 100 may generate relationship networks that may include agents, and exclude non-agents, from the heterogeneous network in order to determine a score for each agent in the heterogeneous network at the time instance. The system 100 may iteratively remove agent nodes from the heterogeneous network, and reconstruct another relationship network based on the remaining agent nodes. The system 100 may use the relationship network that includes the removed agent node, and the reconstructed relationship network without the removed agent node, to determine a score associated with the heterogeneous network without the removed agent. In some examples, the score may indicate a number of disconnected subcomponents and/or nodes among the heterogeneous network without the removed agent. As such, the score may indicate an importance of the removed agent node with respect to the heterogeneous network by showing an impact of the removal of the removed agent node.

FIG. 1 illustrates an example computer system 100 that can be utilized to implement node relevance determination in an evolving network, arranged in accordance with at least some embodiments described herein. In some examples, the system 100 may be implemented by a computer device. The system 100 may include a processor 120, a memory 122, a network generation module 130, and/or a relevancy score module 150. The processor 120, the memory 122, the network generation module 130, and the relevancy score module 150 may be configured to be in communication with each other. The processor 120 may be a central processing unit of a computer device implementing the system 100. In some examples, the processor 120 may be configured to control operations of the network generation module 130 and the relevancy score module 150. In some examples, the network generation module 130 and the relevancy score module 150 may be hardware components such as programmable logic devices, microcontrollers, memory devices, and/or other hardware components, of the processor 120. In some examples, the network generation module 130 and the relevancy score module 150 may be software modules that may be implemented with the processor 120 to perform one or more tasks. In some examples, the network generation module 130 and the relevancy score module 150 may be packaged as an application that may be executed by the processor 120 in order to implement the system 100. In some examples, one or more of the processor 120, the memory 122, the network generation module 130, and the relevancy score module 150 may be parts of resources provided by a cloud computing platform.

The memory 122 may be configured to selectively store instructions executable by the processor 120, the network generation module 130, and the relevancy score module 150. For example, in one embodiment, the memory 122 may store a set of relevancy instructions 124, where the relevancy instructions 124 may include instructions, such as executable code, related to graph and network algorithms, node ranking algorithms, network visualization algorithms, and/or other algorithms related to graphs and networks. The processor 120, the network generation module 130, and the relevancy score module 150 may each be configured to execute one or more portions of the relevancy instructions 124 in order to facilitate implementation of the system 100.

The memory 122 may be further configured to store a relational database 126. The relational database 126 may include datasets indicating relationships among entities of a network. For example, the relationship database 126 may include records, where each record may correspond to an entity. Each record may include one or more attributes, and two or more entities may be deemed as related if their records share one or more attributes. For example, in a relational database for a social media network, each record may correspond to a person, and attributes may include a location, a job, a hobby, an organization, and/or other attributes. In an example, when two records of the relational database for the social media network shares a same organization attribute, then the relational database may indicate a relationship, such as "coworkers", exists between the entities of the two records. The relational database 126 may further include a set of time indices, where each time index may be a timestamp of additions and removals of entities and/or attributes to the relational database 126, or may be a timestamp of relationships being formed and removed from the relational database 126. The relational database 126 may further include indications of whether a particular entity created one or more other entities, and/or relationships with other entities or non-entities, among the relational database 126.

The memory 122 may be further configured to store a node database 128. The node database 128 may be a database including entries that indicate whether each node among the relational database 126 is an agent node or a non-agent node. In an example shown in FIG. 1, the node database 128 may indicate that the nodes 141, 142, 144 are agent nodes, and the nodes 143, 145 are non-agent nodes. In an example embodiment, the node database 128 may be a part of the relational database 126.

The processor 120 may be configured to retrieve, or receive, datasets from one or more sources, and may update the relational database 126 and the node database 128 using the datasets retrieved from the sources. In some examples, the sources may include storage devices that may be resources provided by a cloud computing platform. In an example, a user of a social media network may update a job to indicate a job change. The processor 120 may receive the job change information and may update the relational database 126 to indicate the job change. The update of the job attribute performed by the user may facilitate a creation of one or more a new relationships in the relational database 126 (e.g., addition of new coworkers). Thus, the processor 120 may determine that a node representing the user that changed job may be an agent node because new relationships are facilitated by the node representing the user. The processor 120 may be further configured to register the times in which entities entered and leave the relational database, and the times in which relationships are formed and removed from the relational database 126. The processor 120 may be further configured to determine whether a node is an agent or a non-agent, and update the node database 128 accordingly.

The network generation module 130 may expand a heterogeneous network into a series of temporal heterogeneous networks 132 based on the relational database 126. Each temporal heterogeneous network 132 may include a respective set of agent nodes, non-agent nodes, and edges. Each temporal heterogeneous network 132 may correspond to a time window. The network generation module 130 may use the records and time indices indicated by the relational database 126 to generate the temporal heterogeneous networks 132. For example, the network generation module 130 may extract records associated with a time window T from the relational database 126 to generate a temporal heterogeneous network 132 for the time window T. Each temporal heterogeneous network 132 may be a state of the heterogeneous network at a time window, where the time window may be a time in the past.

In some examples, the processor 120 may be configured to anonymize the records in relational database prior to generating the temporal heterogeneous networks 132, where generation of the temporal heterogeneous networks 132 may be based on the anonymized records.

In an example, the heterogeneous network at a current time may be in a current state. The system 100 may receive a request to rank a set of agent nodes in a time period that spans from one year ago up to half a year ago. The network generation module 130 may generate a number of temporal heterogeneous networks 132 based on the request and based on time intervals that may be specified by the relevancy instructions 124. For example, the network generation module 130 may generate three temporal heterogeneous networks at two-month intervals, or may generate six temporal heterogeneous networks at one-month intervals, where the current state of the heterogeneous network may not be among the generated temporal heterogeneous network based on the time period requested.

In another example, a user may be assigned to a plurality of projects at different times. The assignments of the projects to the user may change over time. Thus, a set of temporal heterogeneous networks may provide indications of the assignment time of each project, the completion time of each project, the duration of time to work on each project, a number of projects assigned to the user at each time window, and/or other attributes relating to the project assignments of the user.

The network generation module 130 may generate the temporal heterogeneous networks 132 at time intervals that may be specified by relevancy instructions 124, or at time intervals that may be defined by a user of the system 100. For example, the network generation module 130 may generate twelve temporal heterogeneous networks 132, one for each month, in order for the system 100 to determine relevancy scores of agent nodes within a one year time span.

In an example shown in FIG. 1, the temporal heterogeneous network 132 at time T may include agent nodes 141, 142, 144 and non-agent node 134. The network generation module 130 may generate additional temporal heterogeneous networks 132 that correspond to different time windows. By expanding the heterogeneous network into discrete time series of networks, an evolution of agent nodes going in or out of the heterogeneous network, as well as the relationship dynamics over time, may be revealed.

Upon generating a series of temporal heterogeneous networks 132, the network generation module 130 may generate a series of relationship networks 134, where each relationship network 134 corresponds to a temporal heterogeneous network 132. In the example shown in FIG. 1, the network generation module 130 may extract agent nodes 141, 142, 144 from the temporal heterogeneous network 132 at time T, and may infer relationships among the extracted agent nodes 141, 142, 144. The network generation module 130 may infer relationships among agent nodes 141, 142, 144 based on the connections of the agent nodes 141, 142, 144 to non-agent node 134 in the temporal heterogeneous network 132 at time T. The network generation module 130 may generate a relationship network 134 that corresponds to the temporal heterogeneous network 132 at time T, based on the extracted agent nodes 141, 142, 144 and based on the relationships inferred among agent nodes 141, 142, 144. As a result, the relationship network 134 may include agent nodes 141, 142, 144 and the inferred relationships, and excludes non-agent node 143. Each inferred relationship (edge) indicated by the relationship network 134 may represent a potential presence of a past relationship between the two entities (nodes) connected by the inferred relationship. A plurality of pairs including a temporal heterogeneous network 132 and a relationship network 134 may be generated by network generation module 130.

The network generation module 130 may further generate a series of conditional relationship networks 136, where each conditional relationship network 136 may be associated with an agent node and may be generated based on a corresponding pair of temporal heterogeneous network 132 and relationship network 134. The network generation module 130 may iteratively remove agent nodes from the temporal heterogeneous network 132 and construct a corresponding conditional relationship network 136 based on the agent nodes remaining at the temporal heterogeneous network 132. In some examples, the network generation module 130 may generate a copy of the temporal heterogeneous network 132, and remove agent nodes from the copy such that the original temporal heterogeneous network 132 may remain intact. In the example shown at FIG. 1, the network generation module 130 may remove agent node 141 from the temporal heterogeneous network 132 at time T. The network generation module 130 may further identify nodes and edges that may have been created by agent node 141, and remove the identified nodes and edges from the temporal heterogeneous network 132. In the example shown in FIG. 1, the network generation module 130 may determine that non-agent node 143 was created by agent node 141 and may remove non-agent node 143 from the temporal heterogeneous network 132. The network generation module 130 may further remove any edges that was connected to the removed agent node 141 and removed non-agent node 143. The network generation module 130 may generate a conditional relationship network 136 based on the remaining agent nodes 142, 144, and may infer relationships between agent nodes 142, 144. In the example of FIG. 1, the network generation module 130 may determine that upon removing the agent node 141, the non-agent node 143, and corresponding edges, there is no relationship between agent nodes 142, 144.

The conditional relationship network 136 may include one or more subcomponents that may be parts of the temporal heterogeneous network 132, where the one or more subcomponents may be disconnected from each other. A subcomponent of a network may be a group of one or more components (nodes and edges connecting the nodes) that are disconnected from other parts of the network. Each subcomponent of the conditional relationship network 136 may include one or more agent nodes that remained from a removal of a particular agent node and/or relationships inferred by network generation module 130. In the example shown in FIG. 1, conditional relationship network 136 may include the agent nodes 142 as a first subcomponent, and may include the agent node 144 as a second subcomponent, which may indicate that agent nodes 142, 144 are no longer related upon the removal of agent node 141.

The relevancy score module 150 may be configured to determine a score for the agent node 141 at time T based on the conditional relationship network 136 at time T without agent node 141. In an example, the relevancy score module 150 may compare a number of subcomponents in the relationship network 134 ("1") with a number of subcomponents in the conditional relationship network 136 without agent node 141 ("2"). Based on the comparison, the relevancy score module 150 may determine that the number of subcomponents increased by "1", and may assign a score of "1" to node 141 at time T. In some examples, an increase in a number of subcomponents may increase an importance of the removed agent node because an increase in the number of subcomponents may indicate entities are being disconnected from the network without the removed agent node (removing the agent node creates disconnected entities).

In some examples, the relevancy score module 150 may determine a relevancy score of a node by using other techniques, such as using the number of subcomponents in conditional relationship network 136 without the removed node, determining a number of connected nodes and/or edges in conditional relationship network 136, and/or other parameters of conditional relationship network 136. In some examples, the relevancy score module 150 may be configure to apply other node scoring techniques to determine the relevancy scores of the agent nodes.

Upon determining relevancy score for each agent node among each temporal heterogeneous network 132 at each time window, the relevancy score module 150 may generate relevancy data 152. The relevancy data 152 may include the determined scores for each agent node among each temporal heterogeneous network 132 at each time window. In some examples, the relevancy score module 150 may include a ranking of the agent nodes based on the scores among the relevancy data 152. For example, the relevancy data 152 may include a ranking of agents nodes based on sorting the relevancy scores for the agent nodes in an increasing or a decreasing order at each time window. In another example, the relevancy data 152 may include a ranking of the agent nodes based on averages of the relevancy scores across a set of time windows. For example, the relevancy data 152 may include ranked scores that are averages of relevancy scores for each node within a time span of one year. In another example, the relevancy data 152 may include a ranking of the agent nodes based on an amount of time in which the relevancy scores remains above a threshold. For example, a first node may be ranked higher than a second node if a first relevancy score of the first node remains above a threshold for six months while a second relevancy score of the second node remains above the threshold for three months. The relevancy data 152 may include rankings of the agent nodes based on various parameters associated with the determined relevancy scores, and based on a desired implementation of the system 100.

FIGS. 2A, 2B, 2C, 2D illustrate the example system of FIG. 1 with additional details relating to a temporal heterogeneous network 202, a relationship network 204, a conditional relationship network 206, and a condition relationship network 208, respectively, arranged in accordance with at least some embodiments described herein. FIGS. 2A, 2B, 2C, 2D may be described below with references to the above descriptions of FIG. 1.

FIGS. 2A, 2B, 2C, 2D may be related to an example where the system 100 of FIG. 1 may be implemented to analyze allocation of machine hosting services. The temporal heterogeneous network 202, shown in FIG. 2A, may be a dynamic heterogeneous network representing one or more machines hosting one or more services. The temporal heterogeneous network 202 may include agent nodes 210, 211, 212, 213, 214, where each agent node may represent a machine. The temporal heterogeneous network 202 may further include non-agent nodes 220, 222, where each non-agent node may represent a service. Agent nodes 211, 212 may be connected to non-agent node 220, which may indicate that machines represented by agent nodes 211, 212 are hosting a service represented by non-agent node 220.

Similarly, agent nodes 213, 214 may be connected to non-agent node 222, which may indicate that machines represented by agent nodes 213, 214 are hosting a service represented by non-agent node 222. Agent node 210 may be connected to non-agent nodes 220, 222, which may indicate that a machine represented by agent node 210 may be hosting services represented by non-agent node 220, 222.

The network generation module 130 of the system 100 may extract agent nodes 210, 211, 212, 213, 214 from the temporal heterogeneous network 202. The network generation module 130 may determine relationships among the extracted agent nodes 210, 211, 212, 213, 214, based on the non-agent nodes 220, 222 of the temporal heterogeneous network 202. For example, the network generation module 130 may determine that agent nodes 210, 211, 212 are connected to a common non-agent node 220 and, in response, may infer relationships (represented by edges 230) among agent nodes 210, 211, 212. The inferred relationships may indicate that agent nodes 210, 211, 212 include at least one similarity, which is this example, is commonly hosting a same service represented by non-agent node 220. Similarly, the network generation module 130 may determine that agent nodes 210, 213, 214 are connected to a common non-agent node 222 and, in response, may infer relationships (represented by edges 231) among agent nodes 210, 213, 214. The network generation module 130 may generate the relationship network 204, shown in FIG. 2B, based on the extracted agent nodes 210, 211, 212, 213, 214, and based on the inferred relationships represented by edges 230, 231.

The network generation module 130 may iteratively remove one or more of agent nodes 210, 211, 212, 213, 214 from the temporal heterogeneous network 202, and generate a conditional relationship network (such as 206, 208) upon each removal of one or more agent nodes. In an example, the network generation module 130 may remove the agent node 210 from the temporal heterogeneous network 202 and may generate a conditional relationship network 206 based on the remaining agent nodes 211, 212, 213, 214. Upon removing agent node 210, agent nodes 211, 212 remain connected to non-agent node 220 and the network generation module 130 may infer a relationship between agent nodes 211, 212. Similarly, agent nodes 213, 214 remain connected to non-agent node 222 and the network generation module 130 may infer a relationship between agent nodes 213, 214. The network generation module 130 may generate the conditional relationship network 206, shown in FIG. 2C, where agent nodes 211, 212 are connected by a first inferred edge, and agent nodes 213, 214 are connected by a second inferred edge. The conditional relationship network 206 without the remove agent node 210 may include a first subcomponent 240 and a second subcomponent 241.

Subsequently, the network generation module 130 may remove the agent node 211 from the temporal heterogeneous network 202 and may generate a conditional relationship network 208 based on the remaining agent nodes 210, 212, 213, 214. Upon removing agent node 211, agent nodes 210, 212 remain connected to non-agent node 220 and the network generation module 130 may infer a relationship between agent nodes 210, 212. Similarly, agent nodes 210, 213, 214 remain connected to non-agent node 222 and the network generation module 130 may infer relationships between agent nodes 210, 213, 214. The network generation module 130 may generate the conditional relationship network 208, shown in FIG. 2D, where agent nodes 210, 212 are connected by an inferred edge and agent nodes 210, 213, 214 are connected by a set of inferred edges. The conditional relationship network 208 without the remove agent node 211 may include one subcomponent (as indicated by the dotted circle).

The network generation module 130 may continue to iteratively remove the remaining agent nodes 212, 213, 214 in order to generate further conditional relationship networks. When the network generation module 130 completes generation of conditional relationship networks for all agent nodes, the network generation module 130 may analyze another temporal heterogeneous network at a new time window, and repeat the generation of relationship networks, removal of agent nodes, and generation of conditional relationship networks for the new time window.

The relevancy score module 150 may compare the conditional relationship network 206 with the relationship network 204 to determine a relevancy score for the agent node 210 that was removed to generate the conditional relationship network 206. The relevancy score module 150 may determine that relationship network 204 includes one subcomponent, and conditional relationship network 206 includes two subcomponents. The relevancy score module 150 may assign a score of "1" to agent node 210 to indicate that the number of subcomponents has increased by "1".

Similarly, the relevancy score module 150 may compare the conditional relationship network 208 with the relationship network 204 to determine a relevancy score for the agent node 211 that was removed to generate the conditional relationship network 208. The relevancy score module 150 may determine that relationship network 204 includes one subcomponent, and conditional relationship network 208 also includes one subcomponent. The relevancy score module 150 may assign a score of "0" to agent node 211 to indicate that the number of subcomponents has not changed. The relevancy score module 150 may determine time dependent relevancy scores for all agent nodes (e.g., relevancy scores of each agent node at more than one time window).

The relevancy score module 150 may rank the agent node 210 higher than the agent node 211 in response to agent node 210 having a high relevancy score. The higher rank of agent node 210 relative to agent node 211 may indicate that agent node 210 may be more important than the agent node 211. Since the example relating to FIGS. 2A, 2B, 2C, 2D relates to allocation of machines configured to host services, the higher rank of 210 may indicate that removal of a machine represented by agent node 210 from the network of machines represented by agent nodes 210, 211, 212, 213, 214, may have a greater impact than a removal of a machine represented by agent node 211. If the relevancy score of agent node 210 is a highest score among relevancy scores for all agent nodes 210, 211, 212, 213, 214, then the machine represented by the agent node 210 may be identified as a most important node among the network of machines, and the system 100 may recommend to retain the machine represented by the agent node 210.

The system 100 may be implemented to extract a set of machines hosting services and infer their relationships (edges) by common association with a specific kind of service in a dynamic heterogeneous network representing the machines and services hosted by the machines. The system 100 may derive a times series of relevance scores and rank the machines based on their robustness. As such, the system 100 may be implemented as a resource allocation system enhanced with techniques described by the present disclosure. Thus, in some aspects, the system of the present disclosure may provide improvements in computer or machine resource allocation and efficiency in computer network or computer architecture over time. In some aspects, an automated or autonomous system may be provided that can automatically or autonomously change or adjust the allocation of machine resources in a network of computer systems, based on receiving a signal representing scores or importance associated with the machines in the computer network (e.g., turn off (deactivate) a machine or turn on (activate) a machine in a network). For instance, such signals may automatically cause one or more machines to be reallocated.

In some examples, the network generation module 130 may remove more than one agent node and may generate conditional relationship networks based on removal of more than one agent nodes. A number of agent nodes to be removed may be defined by the relevancy instructions stored in the memory 122, and may be based on a desired implementation of system 100.

Figure 3:
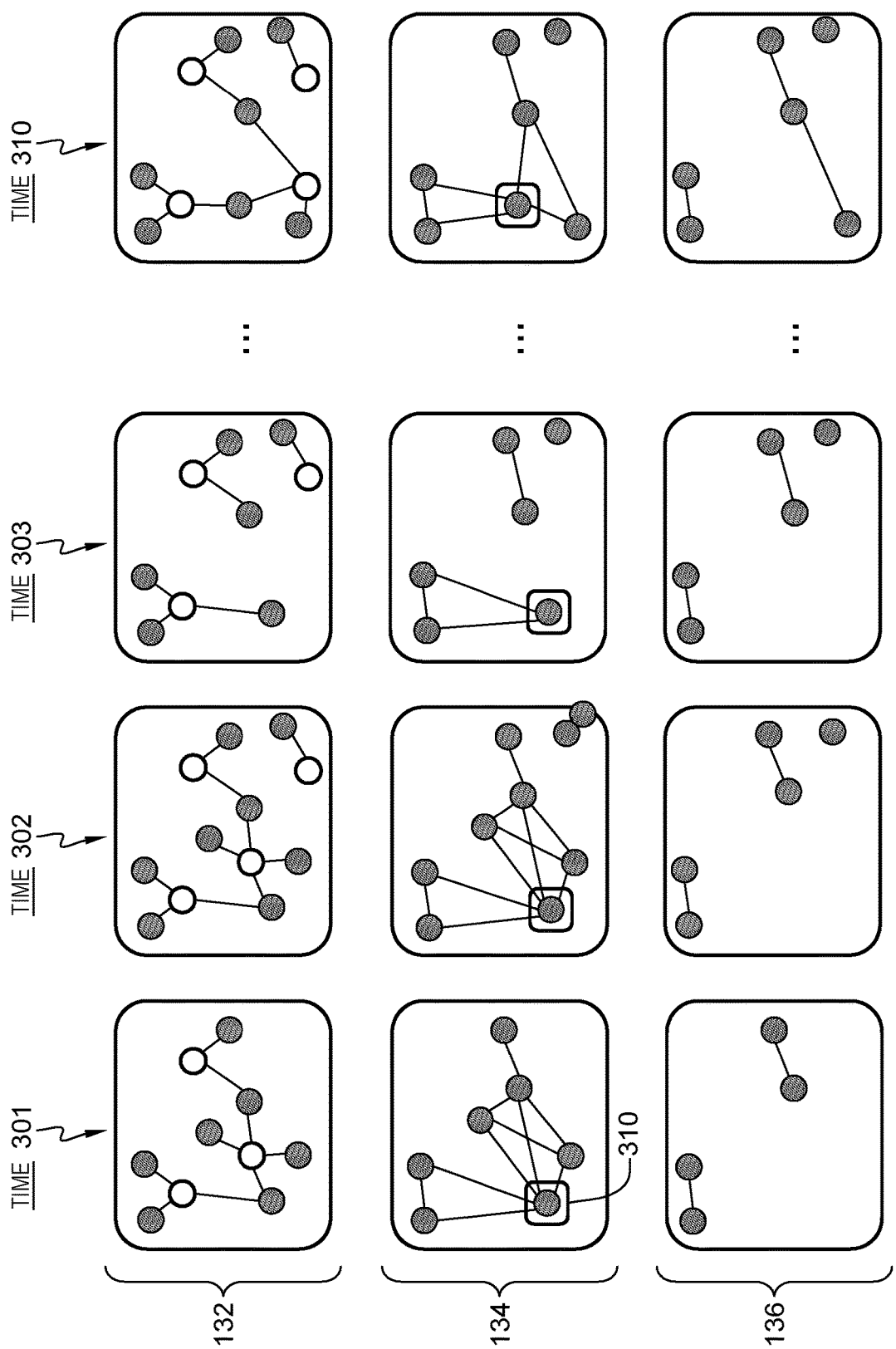
FIG. 3 illustrates the example system of FIG. 1 with additional details relating to node relevance determination in an evolving network in one embodiment of the present disclosure.

FIG. 3 illustrates the example system of FIG. 1 with additional details relating to node relevance determination in an evolving network, arranged in accordance with at least some embodiments described herein. FIG. 3 may include references to components of the computer system 100 of FIG. 1, and may be described below with references to the above descriptions of FIG. 1.

In an example shown in FIG. 3, the network generation module 130 may generate a series of temporal heterogeneous networks 132, a series of relationship networks 135, and a series of conditional relationship network 136. Each temporal heterogeneous network 132 and each relationship network 134 may correspond to a time window, and each conditional relationship network 136 may correspond to a time window and a removed agent node.

As shown by the example in FIG. 3, each time window, including time 301, 302, 303, 310, may correspond to a temporal heterogeneous network, a relationship network, and one or more conditional relationship network 136. The temporal heterogeneous network 132 at time 301 may include different sets of nodes from the temporal heterogeneous network 132 at times 302, 303, and 310. The temporal heterogeneous networks 132 may be different at different times due to additions and removals of nodes and edges as time changes. Thus, the series of relationship networks 134 generated from the network generation module 130 may be different from each other.

At each time, the network generation module 130 may iteratively remove agent nodes from the temporal heterogeneous networks 132 in order to generate the series of conditional relationship networks 136.

The system 100 may be implemented as a network analysis system to perform network analysis on resource allocations. In an example, an agent node may represent a train track and a non-agent node may represent a train station. An implementation of the system 100 may provide analysis on an impact of removing a particular train track. A transit authority may use the results from the analysis to make decisions such as update train infrastructures, schedule maintenance of train tracks, determining whether to remove a train track that may not be as busy as other train tracks, and/or other decisions.

Figure 4:
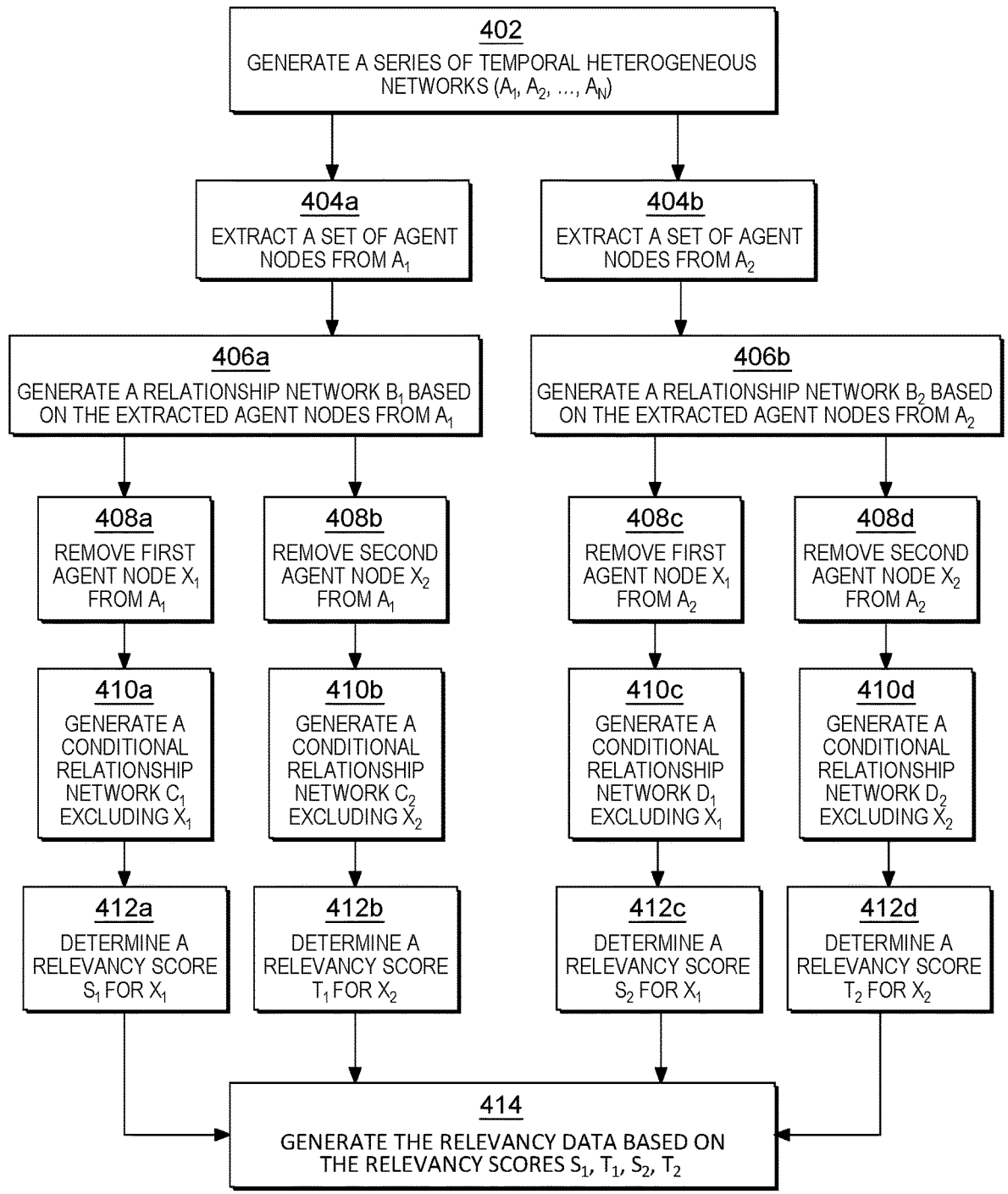
FIG. 4 illustrates a flow diagram relating to node relevance determination in an evolving network in one embodiment of the present disclosure.

FIG. 4 illustrates a flow diagram relating to node relevance determination in an evolving network, arranged in accordance with at least some embodiments presented herein. The process in FIG. 4 may be implemented using, for example, computer system 100 discussed above. An example process may include one or more operations, actions, or functions as illustrated by one or more of blocks 402, 404, 406, 408, 410, 412, and/or 414. Although illustrated as discrete blocks, various blocks may be divided into additional blocks, combined into fewer blocks, eliminated, or performed in parallel, depending on the desired implementation.

Processing may begin at block 402, where a processor may expand a heterogeneous network by generating a series of temporal heterogeneous networks denoted as $A_1$, $A_2, \ldots, A_N$.

Processing may continue from block 402 to blocks 404 (including 404a, 404b). At block 404a, the processor may extract a set of agent nodes from the temporal heterogeneous network $A_1$. At block 404b, the processor may extract a set of agent nodes from the temporal heterogeneous network $A_2$. The processor may further extract agent nodes from each temporal heterogeneous network up to $A_N$.

Processing may continue from blocks 404 to blocks 406 (including 406a, 406b). At block 406a, the processor may generate a relationship network, denoted as $B_1$, based on the agent nodes extracted from the temporal heterogeneous network $A_1$. At block 406b, the processor may generate a relationship network, denoted as $B_2$, based on the agent nodes extracted from the temporal heterogeneous network $A_2$. The processor may further generate a series of relationship networks up to $B_N$, based on the agent nodes extracted from a corresponding temporal heterogeneous network. A number of relationship networks may be equivalent to a number of temporal heterogeneous networks.

Processing may continue from blocks 406 to blocks 408 (including 408a, 408b, 408c, 408d). At block 408a, the processor may remove a first agent node, denoted as $X_1$, from the temporal heterogeneous network $A_1$. At block 408b, the processor may remove a second agent node, denoted as $X_2$, from the temporal heterogeneous network $A_1$. At block 408c, the processor may remove the first agent node $X_1$ from the temporal heterogeneous network $A_2$. At block 408d, the processor may remove the second agent node $X_2$ from the temporal heterogeneous network $A_2$. In some examples, the processor may remove more than one agent node at blocks 408.

Processing may continue from blocks 408 to blocks 410 (including 410a, 410b, 410c, 410d). At block 410a, the processor may generate a conditional relationship network $C_1$ based on agent nodes that remained at the temporal heterogeneous network $A_1$ after the removal of agent node $X_1$, where the conditional relationship network $C_1$ excludes the removed agent node $X_1$. At block 410b, the processor may generate a conditional relationship network $C_2$ based on agent nodes that remained at the temporal heterogeneous network $A_1$ after the removal of agent node $X_2$, where the conditional relationship network $C_2$ excludes the removed agent node $X_2$. At block 410c, the processor may generate a conditional relationship network $D_1$ based on agent nodes that remained at the temporal heterogeneous network $A_2$ after the removal of agent node $X_1$, where the conditional relationship network $D_1$ excludes the removed agent node $X_1$. At block 410d, the processor may generate a conditional relationship network $D_2$ based on agent nodes that remained at the temporal heterogeneous network $A_2$ after the removal of agent node $X_2$, where the conditional relationship network $D_2$ excludes the removed agent node $X_2$.

Processing may continue from blocks 410 to blocks 412 (including 412a, 412b, 412c, 412d). At block 412a, the processor may determine a relevancy score $S_1$ for the agent node $X_1$ based on the relationship network $B_1$ and the conditional relationship network $C_1$. At block 412b, the processor may determine a relevancy score $T_1$ for the agent node $X_2$ based on the relationship network $B_1$ and the conditional relationship network $C_2$. At block 412c, the processor may determine a relevancy score $S_2$ for the agent node $X_1$ based on the relationship network $B_2$ and the conditional relationship network $D_1$. At block 412*d*, the processor may determine a relevancy score $T_2$ for the agent node $X_2$ based on the relationship network $B_2$ and the conditional relationship network $D_2$.

Processing may continue from blocks 412 to block 414. At block 414, the processor may generate relevancy data based on the relevancy scores $S_1$, $T_1$, $S_2$, $T_2$, where the relevancy data may be analyzed by the processor to determine an importance of agent nodes $X_1$, $X_2$ with respect to the heterogeneous network.

Figure 5:
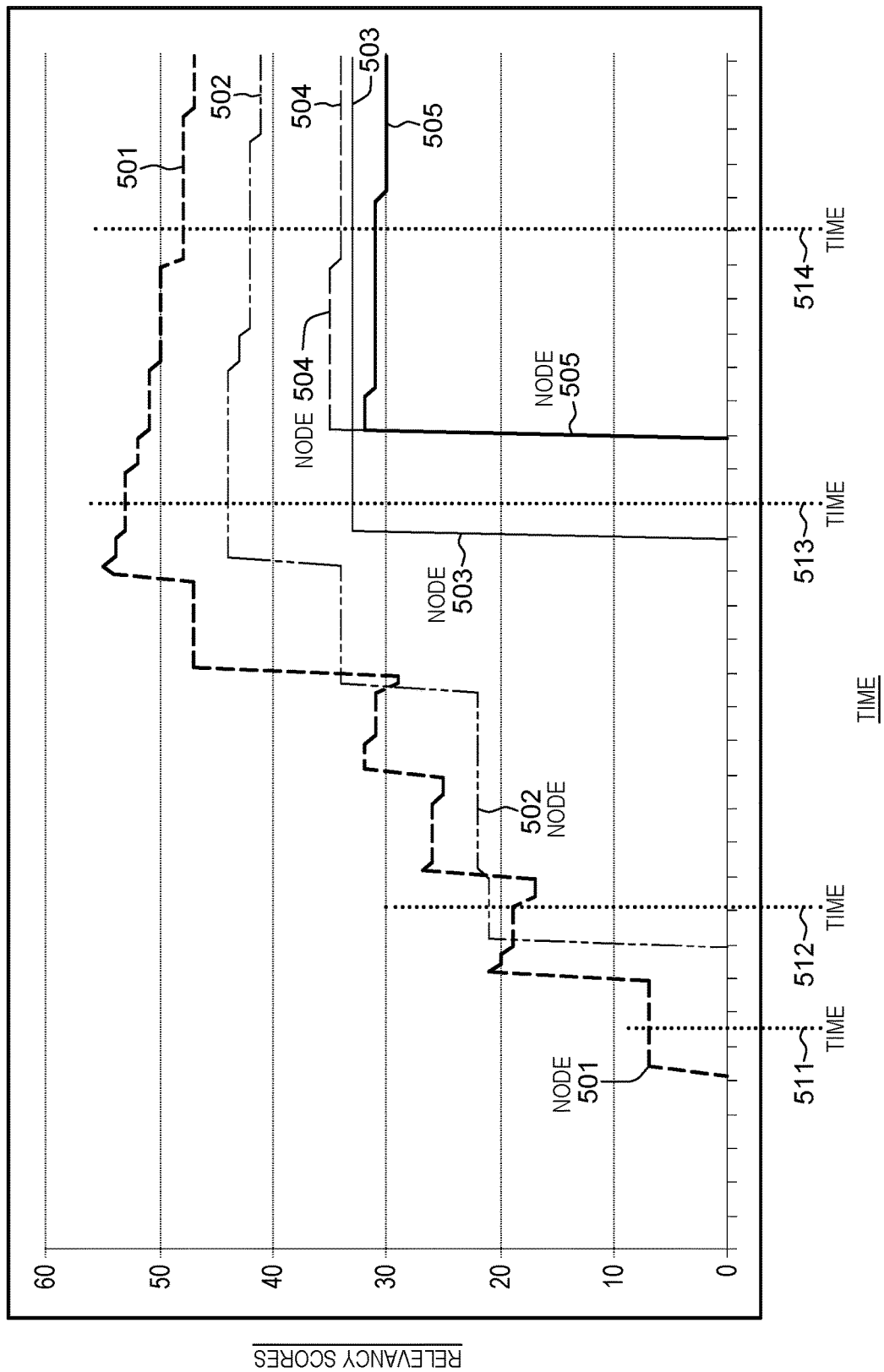
FIG. 5 illustrates an example result from an implementation of the example system of FIG. 1 in one embodiment of the present disclosure.

FIG. 5 illustrates an example result from an implementation of the example system of FIG. 1 in one embodiment of the present disclosure. FIG. 5 may include references to components of the computer system 100 of FIG. 1, and may be described below with references to the above descriptions of FIG. 1.

Generation of the relevancy data 152 by the relevancy score module 150 may include generation of various analysis objects, such as reports, charts, graphs, and/or other objects. In an example shown in FIG. 5, a graph 500 may be generated by the relevancy score module 150, and may be a part of relevancy data 152. The graph 500 may include one or more plots, where each plot may show a change in a relevancy score of an agent node over time.

The graph 500 may provide information such as temporal changes to the heterogeneous network. As the heterogeneous network evolves with time, a number of agent nodes in the heterogeneous network may change. For example, the graph 500 may indicate that at a time 511, the heterogeneous network may include at least one agent node 501. As time progresses, at time 512, the heterogeneous network may include at least two agent nodes 501, 502. The graph 500 may also provide an indication that the agent node 502 was added to the heterogeneous network at a time between the times 511 and 512.

The graph 500 may also provide indications on changes of a ranking of the agent nodes at different times. For example, at time 512, the agent node 502 may be ranked higher than the agent node 501 due to the agent node 502 having a relevancy score that is greater than a relevancy score of the agent node 501. As time progresses, such as at a time 513, the agent node 501 may have a relevancy score that is greater than a relevancy score of the agent node 502 and thus, the agent node 501 may be ranked higher than the agent node 502 at the time 513.

At a time 514, the graph 500 may indicate that the heterogeneous network may include five agent nodes 501, 502, 503, 504, 505, and may provide an indication of a ranking of the five agent nodes. The ranking of the five agent nodes, at time 514, may be based on a decreasing order of the relevancy scores, such that the agent node 501 may be ranked highest (most important) and the agent node 505 may be ranked lowest (least important). In some examples, the system 100 may output analysis objects, such as the graph 500, on a user interface that may be displayed by the system 100 on a display device. A user of the system 100 may view the outputted analysis objects in order to make decisions on applications such as adjusting resource allocations. In another example, a user of the system 100 may view the outputted analysis objects in order to make adjustments to an implementation of system 100, such as requesting analysis of agent nodes across a new time span, define a new number of agent nodes to analyze, and/or other requests.

Figure 6:
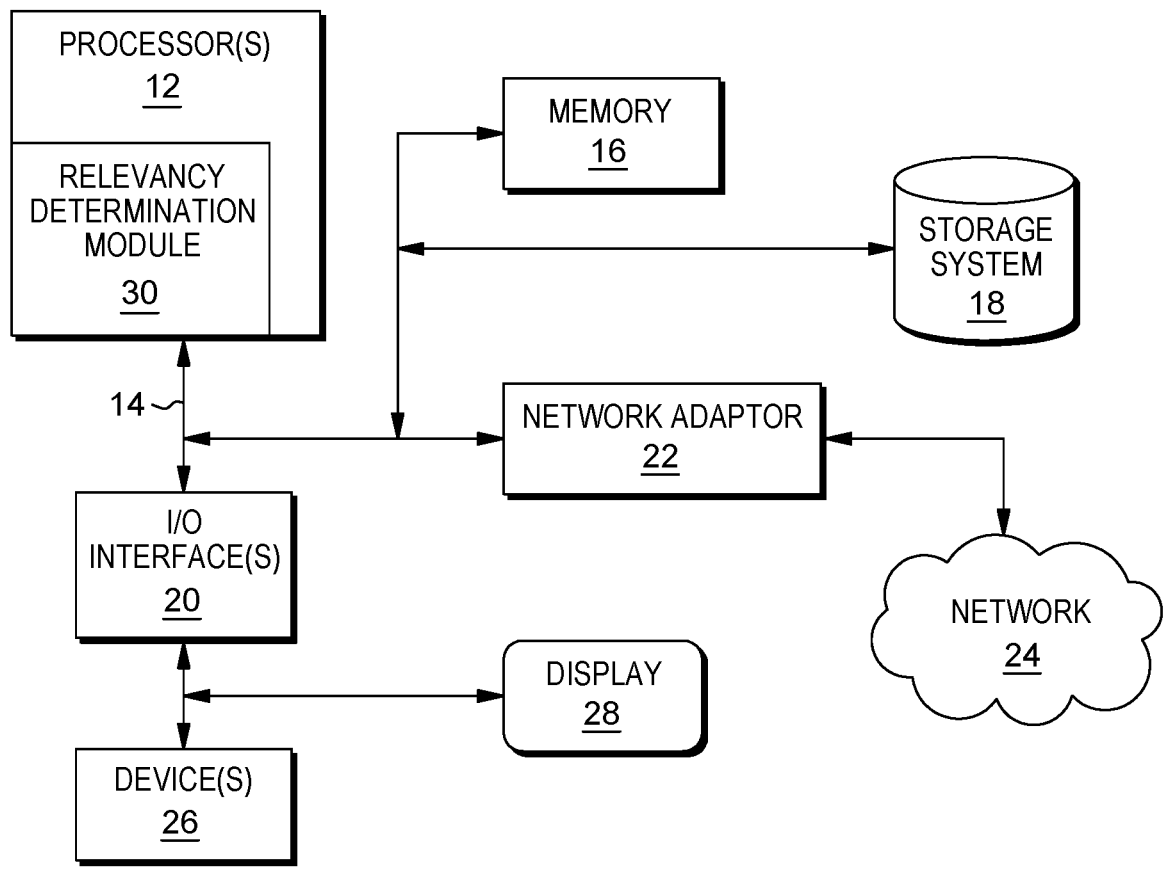
FIG. 6 illustrates a schematic of an example computer or processing system that may implement node relevance determination in an evolving network in one embodiment of the present disclosure.

FIG. 6 illustrates a schematic of an example computer or processing system that may implement node relevance determination in an evolving network in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 6 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 (e.g., relevancy determination module 30) that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Figure 7:
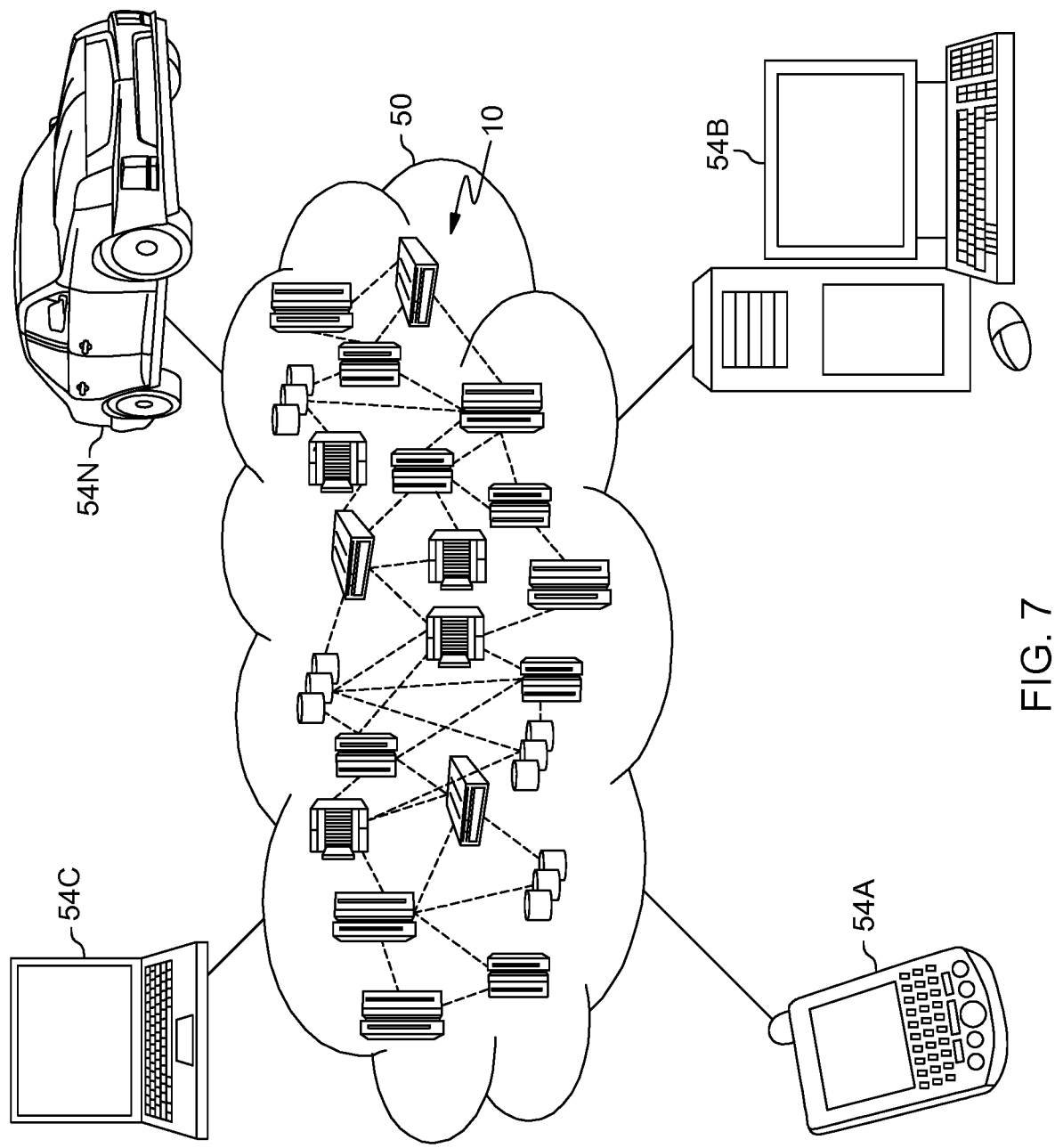
FIG. 7 depicts a cloud computing environment according to an embodiment of the present invention.

FIG. 7 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

FIG. 8 depicts abstraction model layers according to an embodiment of the present invention. Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and node relevancy determination 96.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for generating relevancy data of at least one node among a heterogeneous network that changes with time, the method comprising:
generating, by a processor, a series of temporal heterogeneous networks, wherein each temporal heterogeneous network is a state of a heterogeneous network at a time window, wherein the heterogeneous network changes with time, and each temporal heterogeneous network includes a respective set of agent nodes and a respective set of non-agent nodes;
for each temporal heterogeneous network:
extracting, by the processor, a set of agent nodes;
generating, by the processor, a relationship network based on the extracted agent nodes, wherein the relationship network includes the extracted agent nodes, and the relationship network corresponds to the temporal heterogeneous network;
for an agent node among each pair of temporal heterogeneous network and relationship network:
removing, by the processor, the agent node from the temporal heterogeneous network;
generating, by the processor, a conditional relationship network based on the remaining agent nodes among the temporal heterogeneous network after the removal of the agent node;
determining, by the processor, a relevancy score for the removed agent node based on the relationship network and based on the conditional relationship network, wherein the relevancy score corresponds to the time window; and
generating, by the processor, the relevancy data based on the relevancy scores for each agent node among each temporal heterogeneous network, wherein the relevancy data indicates changes of the relevancy scores of each agent node with respect to time.

2. The method of claim 1, wherein generating the relationship network includes determining, by the processor, relationships among the extracted agent nodes based on the non-agent nodes in the temporal heterogeneous network.

3. The method of claim 1, wherein removing the agent node from the temporal heterogeneous network includes removing the agent node from a copy of the temporal heterogeneous network.

4. The method of claim 1, wherein each temporal heterogeneous network further includes relationships among the agent nodes and the non-agent nodes, and removing the agent node from the temporal heterogeneous network includes removing relationships associated with the agent node from the temporal heterogeneous network.

5. The method of claim 1, wherein generating the conditional relationship network includes determining, by the processor, relationships among the remaining agent nodes of the temporal heterogeneous network based on the non-agent nodes in the temporal heterogeneous network.

6. The method of claim 1, wherein determining the relevancy score includes determining, by the processor, a number of subcomponents among the conditional relationship network.

7. The method of claim 1, wherein determining the relevancy score includes:
   determining, by the processor, a first number of subcomponents among the relationship network;
   determining, by the processor, a second number of subcomponents among the conditional relationship network; and
   comparing, by the processor, the first number of subcomponents with the second number of subcomponents.

8. The method of claim 1, further comprising ranking, by the processor, the agent nodes among the heterogeneous network by sorting the relevancy scores for each agent node among each temporal heterogeneous network.

9. The method of claim 1, wherein removing the agent node from the temporal heterogeneous network includes removing more than one agent nodes.

10. A system effective to generate relevancy data for at least one node among a heterogeneous network that changes with time, the system comprising:
   a memory configured to store a database including records related to at least one entity;
   a processor configured to be in communication with the memory, the processor is configured to:
   generate a series of temporal heterogeneous networks based on the database stored in the memory, wherein each temporal heterogeneous network is a state of a heterogeneous network at a time window, wherein the heterogeneous network changes with time, and each temporal heterogeneous network includes a respective set of agent nodes and a respective set of non-agent nodes;
   for each temporal heterogeneous network:
      extract a set of agent nodes;
      generate a relationship network based on the extracted agent nodes, wherein the relationship network includes the extracted agent nodes, and the relationship network corresponds to the temporal heterogeneous network;
   for an agent node among each pair of temporal heterogeneous network and relationship network:
      remove the agent node from the temporal heterogeneous network;
      generate a conditional relationship network based on the remaining agent nodes among the temporal heterogeneous network after the removal of the agent node;
      determine a relevancy score for the removed agent node based on the relationship network and based on the conditional relationship network, wherein the relevancy score corresponds to the time window; and
   generate the relevancy data based on the relevancy scores for each agent node among each temporal heterogeneous network, wherein the relevancy data indicates changes of the relevancy scores of each agent node with respect to time.

11. The system of claim 10, wherein the processor is further configured to determine relationships among the extracted agent nodes based on the non-agent nodes in the temporal heterogeneous network in order to generate the relationship network.

12. The system of claim 10, wherein the processor is further configured to remove removing the agent node from a copy of the temporal heterogeneous network.

13. The system of claim 10, wherein each temporal heterogeneous network further includes relationships among the agent nodes and the non-agent nodes, and the processor is further configured to remove relationships associated with the agent node from the temporal heterogeneous network in order to generate the relationship network.

14. The system of claim 10, wherein the processor is further configured to determine a number of subcomponents among the conditional relationship network in order to determine the relevancy score.

15. The system of claim 10, wherein the processor is further configured to:
   determine a first number of subcomponents among the relationship network;
   determine a second number of subcomponents among the conditional relationship network; and
   compare the first number of subcomponents with the second number of subcomponents, wherein the determination of the relevancy score is based on the comparison.

16. The system of claim 10, wherein the processor is further configured to rank the agent nodes among the heterogeneous network by sorting the relevancy scores for each agent node among each temporal heterogeneous network.

17. A computer program product for generating relevancy data of at least one node among a heterogeneous network that changes with time, the computer program product comprising a computer readable storage medium having program instructions embodied therewith, the program instructions executable by a processing element of a device to cause the device to:
   generate a series of temporal heterogeneous networks, wherein each temporal heterogeneous network is a state of a heterogeneous network at a time window, wherein the heterogeneous network changes with time, and each temporal heterogeneous network includes a respective set of agent nodes and a respective set of non-agent nodes;
   for each temporal heterogeneous network:
      extract a set of agent nodes;
      generate a relationship network based on the extracted agent nodes, wherein the relationship network includes the extracted agent nodes, and the relationship network corresponds to the temporal heterogeneous network;
   for an agent node among each pair of temporal heterogeneous network and relationship network:
      remove the agent node from the temporal heterogeneous network;
      generate a conditional relationship network based on the remaining agent nodes among the temporal heterogeneous network after the removal of the agent node;
      determine a relevancy score for the removed agent node based on the relationship network and based on the conditional relationship network, wherein the relevancy score corresponds to the time window; and
   generate the relevancy data based on the relevancy scores for each agent node among each temporal heterogeneous network, wherein the relevancy data indicates changes of the relevancy scores of each agent node with respect to time.

18. The computer program product of claim 17, wherein the program instructions are further executable by the processing element of the device to cause the device to determine relationships among the extracted agent nodes based on the non-agent nodes in the temporal heterogeneous network in order to generate the relationship network.

19. The computer program product of claim 17, wherein the program instructions are further executable by the processing element of the device to cause the device to:
   determine a first number of subcomponents among the relationship network;
   determine a second number of subcomponents among the conditional relationship network; and
   compare the first number of subcomponents with the second number of subcomponents.

20. The computer program product of claim 17, wherein the program instructions are further executable by the processing element of the device to cause the device to rank the agent nodes among the heterogeneous network by sorting the relevancy scores for each agent node among each temporal heterogeneous network.

* * * * *